United States Patent
Rowland-Hill

[15] 3,645,270
[45] Feb. 29, 1972

[54] AXIAL FLOW THRESHING AND SEPARATING UNIT CREATING AN AIRFLOW ALONG THE GRAIN PAN

[72] Inventor: Edward William Rowland-Hill, New Holland, Pa.

[73] Assignee: Sperry Rand Corporation, New Holland, Pa.

[22] Filed: Nov. 24, 1969

[21] Appl. No.: 879,216

Related U.S. Application Data

[63] Continuation-in-part of Ser. No. 790,145, Jan. 9, 1969.

[52] U.S. Cl. ........................................................130/27 T
[51] Int. Cl. .........................................................A01f 12/20
[58] Field of Search ....................................130/27 R, 27 T

[56] References Cited

UNITED STATES PATENTS

| | | | |
|---|---|---|---|
| 2,053,148 | 9/1936 | James | 130/27 T |
| 2,050,631 | 8/1936 | Schlayer | 130/27 T |
| 3,481,343 | 12/1969 | Van Buskirk | 130/27 T |
| 3,529,645 | 9/1970 | Murray et al. | 130/27 T |

*Primary Examiner*—Antonio F. Guida
*Attorney*—Joseph A. Brown, John C. Thompson, James J. Kennedy and George C. Bower

[57] ABSTRACT

An axial-flow-type combine has threshing and separating unit or units with rotor or rotors creating an airflow through the concaves onto the grain pan to assist in the movement of the grain along the grain pan and to remove chaff and other light material from the grain. The separator rotor or rotors have control means in the form of radial discs to restrict the flow of air through the concaves.

9 Claims, 4 Drawing Figures

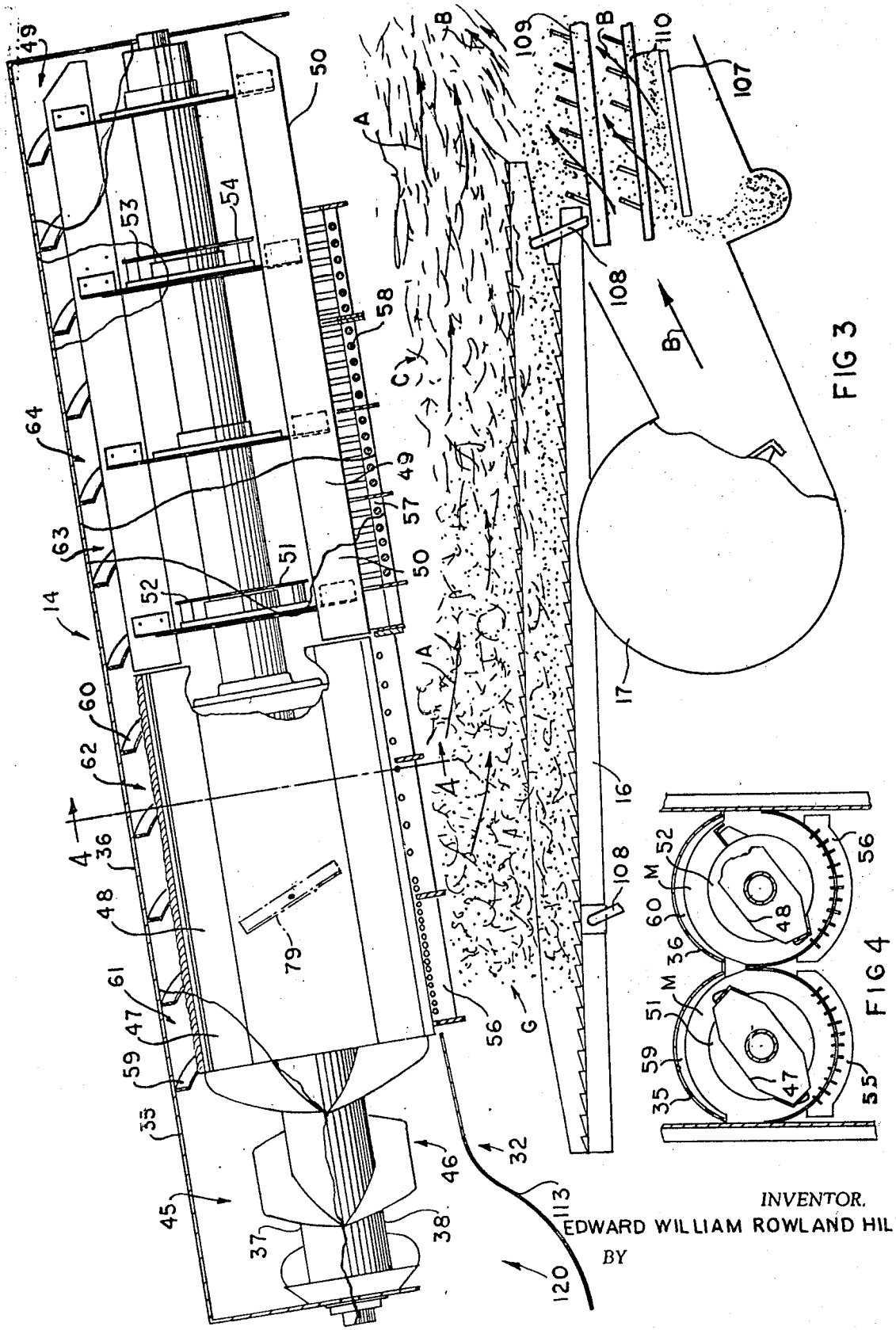

3,645,270

AXIAL FLOW THRESHING AND SEPARATING UNIT CREATING AN AIRFLOW ALONG THE GRAIN PAN

RELATED APPLICATIONS

This is in-part a continuation of my patent application serial 790,145 filed on Jan. 9, 1969, and entitled "An Axial Flow Threshing and Separating Machine."

BACKGROUND OF THE INVENTION

This invention relates to axial-flow-type combines and is directed particularly to creating and controlling airflow through the concaves over and onto the grain pan.

In axial-type and transverse-type combines the threshed grain is dropped onto a grain pan which reciprocates in the fore-and-aft direction to distribute the grain on the pan and to shake the grain off the rear edge onto a chaffer sieve. The grain and chaff are separated on the chaffer sieve with the grain passing through the sieve and the heavy chaff being discharged at the rear of the combine. The light chaff is carried out of the combine by a stream of air passing through the sieve. The grain on the pan includes chaff, debris, juices and other material depending on the crop that is harvested.

The high threshing rate of twin axial combines affects the ability of the chaffer sieve to handle the increase in separation required with the higher output. With this output, more chaff is deposited with the grain making it more difficult to separate the chaff from the grain and increasing the likelihood of the airflow through the chaffer sieve being reduced below the level to suspend the light chaff.

Another problem is the accumulation of crop material on the grain pan. Debris in the form of dirt and the chaff and juices may, with some types of crop, build up over a period of harvesting reducing the effectiveness of the grain pan and requiring the cleaning of the pan. It is, therefore, desirable to prevent this accumulation from occurring. Various solutions have been tried in modifying the grain pan or substituting other conveyance means. These means also have shortcomings which may present additional problems. Augers have been used. These present the problem of grain crackage along with other difficulties. MOving conveyor belts have been tried and found to have shortcomings of side overloading on hillside operation producing grain crackage and improperly loading the chaffer sieve.

The purpose of this invention is to increase the rate of movement of grain off the grain pan and to reduce the separation load on the chaffer sieve. It is a further purpose to prevent the accumulation of material on the grain pan.

OBJECTS AND SUMMARY OF THE INVENTION

An object of this invention is to increase the rate of handling of grain by the grain pan and the separation of the grain and chaff by the grain cleaning means.

Another object of the invention is to remove light chaff from the grain on the grain pan.

Another object of the invention is to maintain the grain pan dry under certain crop conditions in which juices and mud are deposited on the grain pan.

Another object of the invention is to provide a controlled flow of air through the concaves of a combine.

Another object of the invention is to provide means for controlling the airflow in the separating section.

Another object of the invention is to reduce the amount of chaff on the chaffer sieve and thereby increase the amount of grain the chaffer sieve can handle.

In summary, an axial-flow-type combine has a threshing rotor in the threshing and separating section that blows air through the concaves over and onto the grain pan and has control means in the separating section to restrict and control the flow of air.

These and other objects and advantages of this invention will be apparent from the following description and claims taken in conjunction with the accompanying drawings which illustrate the various features of this invention.

BRIEF DESCRIPTION OF THE DRAWINGS

FIG. 3 is an enlarged view illustrating the threshing and separating means and the grain pan.

FIG. 4 is a transverse sectional view of the threshing and separating section of the two units taken along line 4—4 of FIG. 3.

DETAILED DESCRIPTION OF THE PREFERRED EMBODIMENT

INTRODUCTION

Figure 2:
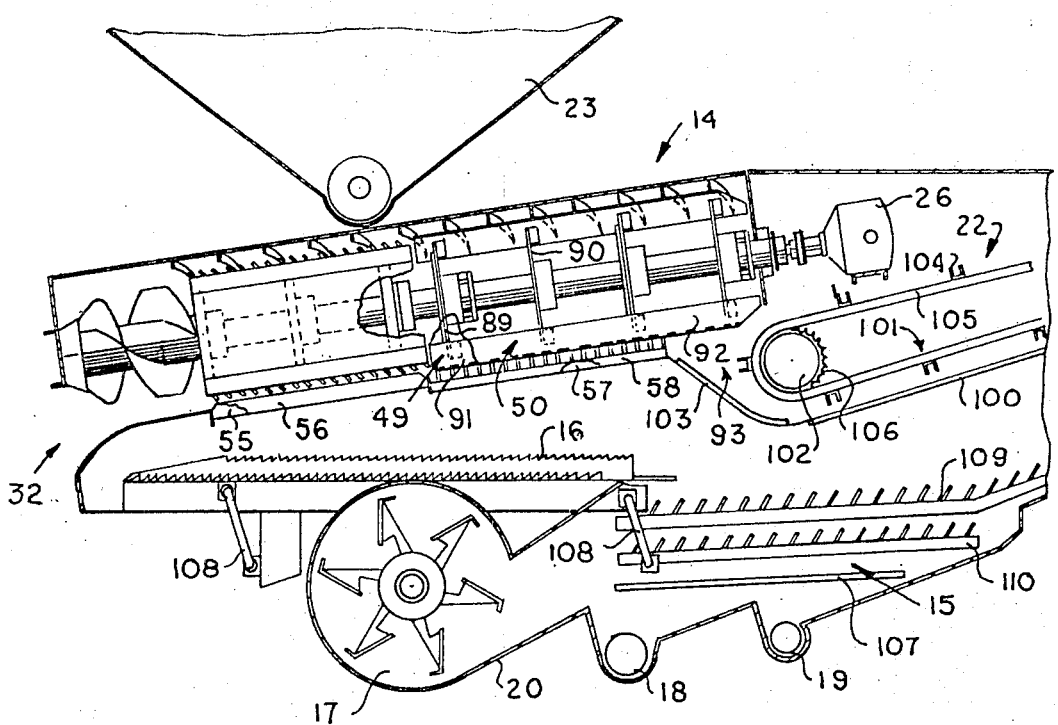
FIG. 2 is a section view of the combine illustrating the threshing and separating unit,, discharge conveyor, grain pan and grain cleaning means.
Figure 1:
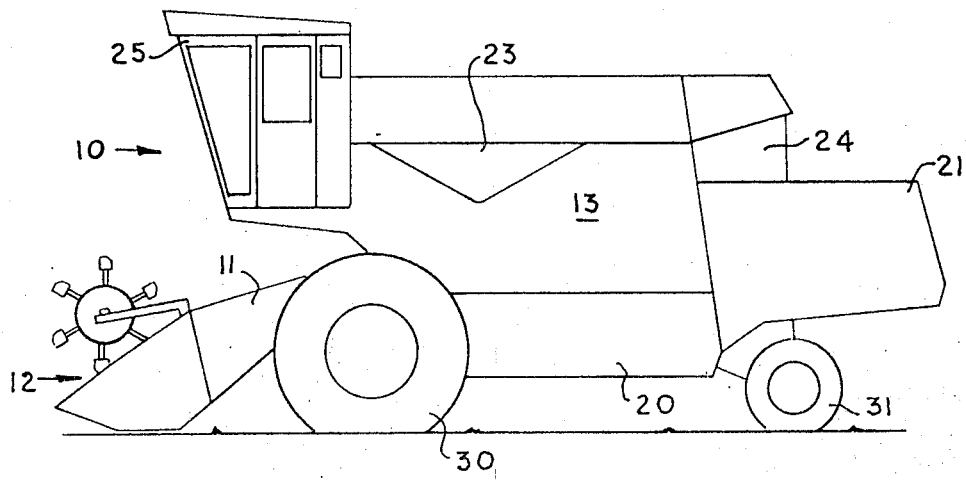
FIG. 1 is a side view of a combine with a header and crop elevator.

In FIG. 1 the combine 10 is exteriorly illustrated with a crop elevator 11 and header 12 mounted on front. The main frame or housing 13 of the combine internally supports the crop threshing and separating means 14, the grain-cleaning means 15 and the grain pan 16, shown in FIG. 2. The rear housing 21 encloses the discharge conveyor 22 extending rearwardly from the threshing and separating means. On top of the combine is the grain tank 23 and the internal combustion engine 24 positioned to the rear of the tank. The blower 17, grain auger 18 and tailings auger 19 are enclosed in the lower housing 20 underneath the main frame or housing 13. The operator's cab 25 extends forwardly from the main housing 13 and over the crop elevator 11 for a clear view of the header 12. The combine is conventionally supported by two large drive wheels 30 on front and two small steering wheels 31 on the rear.

The threshing and separating means 14 extends longitudinally in the direction of movement of the combine and has the crop-feeding means 32 at the front for receiving crop from the header and elevator. The crop is then carried axially and circumferentially to thresh and separate the grain from the crop material and discharge the crop material without the grain at the rear to a conveyor which carries the crop material rearwardly for discharge from the combine.

In this preferred embodiment the threshing and separating means is described as two units (FIGS. 3 and 4) in adjacent side by side relation. However, the invention described and shown in this embodiment is equally applicable to a single threshing and separating unit. I0 FIGS. 3 and 4 the right- and left-hand units are illustrated. The right- and left-hand threshing and separating sections are sectionally shown in FIG. 4 and in FIG. 3 fragments of the left-hand unit are removed to illustrate portions of the crop-feeding means, threshing and separating section and the separating section of the right hand unit.

THRESHING AND SEPARATING MEANS

The two units have generally cylindrically shaped casings 35, 36 with vanes 59, 60 along the inner top portions of the casings for forcing the crop material rearwardly. The crop-feeding means 32 (FIG. 3) at the front of the combine has augers 45, 46 on shafts 37, 38, respectively, and a ramp means 113 extending across the combine. The ramp means 113 slopes forwardly and downwardly to provide an opening 120 with the front walls 65, 66. The crop elevator 11 delivers the cut crop to the ramp means from the header 12. The ramp means guides the cut crop upwardly into the midportions of the augers 45, 46 which forces it into the threshing and separating means. An air passage is provided through the crop elevator 11, opening 120, and the augers 45, 46 to the threshing and separating sections 61, 62.

In the threshing and separating sections 61, 62 are the threshing and separating rotors 47, 48 cooperating with the concaves 55, 56 to thresh and separate most of the grain (FIGS. 3 and 4). In the separating sections 63, 64 the rotors 49, 50 have blades 91, 92 on spiders 89, 90. The blades sweep the crop material across the grates 57, 58, respectively, for separating most of the grain remaining in the mat of crop material and discharge through opening 93. The shafts 37, 38 are driven by transmissions 26.

The mat of crop material in the form of straw is discharged through the bottom opening 93 at the end of the casings to the discharge conveyor 22 for a final separation action to remove the remaining grain. In FIG. 3 the discharge conveyor has been omitted.

DISCHARGE CONVEYOR

The threshing and separating units are inclined upwardly toward the rear and the discharge conveyor 22 is at a lower level to partially overlap the discharge end of the threshing and separating units and extend rearwardly at a slightly upwardly inclined angle. The discharge conveyor 22 comprises a bottom grate 100 and an endless conveyor 101 having chains 105 mounted on the front sprockets 106 on a front roll 102 and on the rear sprockets (not shown). A chute 103 slopes downwardly from the end of the separating grates 57, 58 underneath the discharge openings and then curves slightly upwardly underneath the discharge openings and then curves slightly upwardly underneath the front end of the conveyor. The chute, bottom grate and conveyor extend transversely across the width of the combine to receive the discharged crop material from both units. The conveyor is of the undershot type and has transverse bars 104 attached to the chains 105 for gripping the crop dropped onto the bottom grate and sweeping it rearwardly along the bottom grate for further separation of any remaining entrained grain.

GRAIN HANDLING AND CLEANING MEANS

The concaves 55, 56 (FIG. 4) and separator grates 57, 58 (FIGS. 2 and 3) in the casings 35, 36 are positioned over the grain pan 16 for the full length of the concaves and nearly the full length of the grates. Grain drops from the concaves onto the pan and is moved rearwardly by oscillatory movement of the links 108. More than or nearly more than 90 percent of the grain passes through the concaves onto the grain pan. This grain contains chaff, dust, small debris and with certain crops the grain and chaff will carry juices, mud or dirt. The oscillatory fore-and-aft motion of the pan and the downward incline to the rear causes the grain and chaff to move towards the rear and drop off the grain pan onto the chaffer sieve 109. The blower 17 blows air in a stream B (FIG. 3) through the chaffer and grain sieves and out the rear of the combine. The light chaff is rendered airborne and carried out of the combine. The grain passes through the chaffer sieve onto the grain sieve 110 and the heavier chaff is discharged off the rear of the chaffer sieve 109 onto the ground. The grain sieve passes grain to the grain chute 107 for delivery to the grain auger 18. Tailings drop off the rear and into the tailings auger 19.

AIRFLOW FROM CONCAVES ACROSS GRAIN PAN

In keeping with the high threshing output of this axial unit, the capacity of the grain pan and sieves has to be increased over the conventional transverse threshing units. Also, it is very desirable to increase the reliability of the operation of the grain pan and sieves.

The juices and dirt tend to accumulate on the grain pan eventually interfering with its proper operation. Grain piles up and the threshing operation has to be stopped and the grain pan cleaned.

In this improvement the sidewalls of the threshing and separating rotors 47, 48 are solid and the rotor functions as a fan. Air is drawn in through the crop-feeding means 32 and the separating sections 63, 64 and forced out through the concaves onto the grain pan and the space above the grain pan as an airflow A. The air on the grain pan has generally two actions. One is to physically or mechanically assist the movement of grain along the grain pan. The other is to render the light chaff airborne and blow it into the airstream B from the blower 17. As illustrated in FIG. 3 the dense grain G and light chaff C pass through the concaves 55, 56. The airflow is controlled by restrictive means to let the grain drop on the pan and to lift or carry the light chaff into the airstream A produced by blower 17. This airstream carries the chaff out of the rear of the combine.

Essentially the airflow from the rotors 47, 48 partially cleans the grain and helps force it off the grain pan. The physical movement of the grain increases the amount of the grain pan 16 handles and the cleaning action reduces the amount of chaff the chaffer sieve 109 has to handle. With the reduced chaff on the sieve, the grain is more rapidly cleaned and passed through the chaffer sieve. Thus grain is handled at a greater rate with a more rapid delivery of grain to the sieves.

These airflow restrictive means may be discs 51, 53 and 52, 54 mounted on the shafts 37 and 38 in the separating rotor 49, 50. The discs 53, 54 are placed at the discharged end of the rotors and the discs 51, 52 are placed at the entrance of the rotor. The discs 51, 53 and 52, 54 are solid and attached to the shaft 37 and 38, respectively, and extend radially. The flow of air may be set by the diameter of the disc. The air flows around the periphery of the disc so that amount of air passed is set by the spacings M between the periphery of the discs and the casings. The discs, however, prevent the flow of air, to any material extent, from the separating section to the threshing and separating section. The spaces M provide passage of the threshed crop material into and from the separator section. The major supply of air is through the header 12 and crop elevator 11 to the crop feeding means 32.

These discs 51, 53 and 52, 54 also effectively prevent any airflow through the grates 57 and 58 that may be caused by a fan action of the blades 91, 92 of the separator rotors. Any substantial airflow would interfere with the grain and chaff on the grain pan and chaffer sieve. The main portion of the air is drawn in through the crop elevator and the crop-feeding means into the threshing and separating section for discharge by the rotor through the concaves.

The airflow also dries the juices and mud so that sticky layers with accumulated chaff, and grain cannot develop. The grain pan 16 remains clear for the continuous flow of grain.

If desired, vanes 79 (shown in dot-dash) on FIG. 3 may be adjustably mounted on the sides of the threshing and separating rotors 47, 48. The angle of the vanes may be changed to alter the blowing action of the rotor.

SUMMARY OF FEATURES AND ADVANTAGES OF THE INVENTION

A particular feature of this invention is the elimination of the cloud of dust associated with conventional combines. The header, crop elevator and threshing cylinder create a large amount of dust which forms a cloud around the driver making it difficult to observe operation of the header and progress of the combine. This cloud often becomes quite objectionable and various means have been tried to reduce the problem. In this invention the threshing and separating rotors draw air up through the crop elevator. This also draws the dirt and dust so that the space around and above the header and elevator is clear and the operator can see the header and field.

It is thus seen from the foregoing description that a new relation has been set forth between the threshing means and the grain handling and cleaning means. By interrelating these the airflow from the threshing rotor is utilized to increase the capacity of the grain pan and the chaffer sieve without increasing in the size of the grain pan or grain-cleaning means. The airflow from the threshing rotor separates some of the light chaff from the grain by rendering it airborne. The airborne chaff blows into the airstream B and carries it out of the combine. This is light chaff that the chaffer sieve has to handle. When the grain is deposited on the chaffer sieve it has already been partially cleaned. Thus this cleaning action relieves the chaffer sieve and blower of this separation.

Further the airflow has a drying action on the grain pan and materials thereon. The reduction or removal of the juices and moisture that may cause the grain, chaff and dirt to accumulate aids in maintaining the grain pan in a condition to collect and pass grain.

While the invention has been described, it will be understood that it is capable of further modifications and this application is intended to cover any variations, uses, or adaptations of the invention following in general, the principles of the invention and including such departures from the present disclosure as come within known or customary practices in the art to which the invention pertains, and as may be applied to the essential features hereinbefore set forth and as fall within the scope of the invention or the limits of the appended claims.

Having thus described my invention, what I claim is:

1. A mobile axial flow threshing and separating machine comprising a casing having longitudinally extending concaves and grates, rotor means rotatably mounted in said casing and having longitudinally extending rasp bars cooperating with said concaves to form a threshing and separating section and blades cooperating with said grates to form a separating section, said casing and said rotor means having crop-feeding means on the opposite end of said threshing and separating means from said separating section for delivering crop material to said threshing and separating section, a grain pan underneath said concaves and grates, said rotor means in said threshing and separating section having an elongated diametric shape with means for forming the threshing section of the rotor means into a fan for blowing air through said concaves above and along said grain pan, and airflow restrictive means in said casing to limit the airflow through said concaves so that the grain drops on said grain pan and light chaff is rendered airborne for discharge from the rear of the combine.

2. A mobile axial flow threshing and separating machine as set forth in claim 1, wherein said restrictive means are radial disc means in said separating sections to control the amount of air flowing through said separating section to said fanlike rotor means.

3. A mobile axial flow threshing and separating machine as set forth in claim 2, wherein said disc means are mounted on said rotor means and said separating section and said crop-feeding means passes air to said threshing and separating section.

4. A mobile axial flow threshing and separating machine as set forth in claim 2, wherein said disc means are mounted on said rotor means at the discharge end of said separating section.

5. A mobile axial flow threshing and separating machine as set forth in claim 2, wherein said disc means are mounted on said rotor means in said separating section adjacent said threshing and separating section.

6. A mobile axial flow threshing and separating machine as set forth in claim 2, wherein said disc means are mounted on said rotor means in said separating section at said discharge end of said separating section and adjacent said threshing and separating section.

7. A mobile axial flow threshing and separating machine as set forth in claim 2, wherein said disc means are solid.

8. A mobile axial flow threshing and separating machine as set forth in claim 1, wherein said rotor means in said threshing and separating section have members at an angle to the axis of said rotor means to assist in producing an airflow through said concaves.

9. A mobile axial flow threshing and separating machine as set forth in claim 8, wherein said members are adjustable for setting the airflow to desired conditions.

* * * * *